United States Patent [19]
Kuwamoto et al.

[11] Patent Number: 5,493,420
[45] Date of Patent: Feb. 20, 1996

[54] DOT DENSITY CONVERSION METHOD AND SYSTEM

[75] Inventors: Hideki Kuwamoto; Tadashi Kuwabara, both of Yokohama; Shigeyuki Taguchi; Hitoshi Tamura, both of Hitachi; Keiichi Nakane, Yokohama, all of Japan

[73] Assignee: Hitachi, Ltd., Tokyo, Japan

[21] Appl. No.: 479,299

[22] Filed: Feb. 13, 1990

[30] Foreign Application Priority Data

Feb. 20, 1989 [JP] Japan .................................. 1-38217

[51] Int. Cl.⁶ ........................... H04N 1/393; H04N 1/40
[52] U.S. Cl. .................... 358/462; 358/451; 382/298
[58] Field of Search .................. 340/731, 723; 364/519; 358/451, 450, 452, 453, 462, 428, 448, 456, 457; 395/128, 147; 382/47, 9, 55, 61, 298

[56] References Cited

U.S. PATENT DOCUMENTS

| | | | |
|---|---|---|---|
| 4,394,693 | 7/1983 | Shirley | 358/451 |
| 4,555,191 | 11/1985 | Gojo | 340/731 |
| 4,692,757 | 9/1987 | Tsuhara et al. | 340/723 |
| 4,694,352 | 9/1987 | Ina et al. | 382/55 |
| 4,748,443 | 5/1988 | Uehara et al. | 340/731 |
| 4,760,463 | 7/1988 | Nonoyama et al. | 358/453 |
| 4,837,635 | 6/1989 | Santos | 358/453 |
| 4,881,069 | 11/1989 | Kameda et al. | 340/731 |
| 4,893,258 | 1/1990 | Sakuragi | 358/451 |
| 4,903,145 | 2/1990 | Funada | 358/462 |
| 4,907,171 | 3/1990 | Nagashima | 358/451 |
| 4,930,021 | 5/1990 | Okada | 358/445 |
| 4,937,677 | 6/1990 | van Dorsselaer | 358/451 |
| 4,942,479 | 7/1990 | Kanno | 358/448 |

FOREIGN PATENT DOCUMENTS 63-54867  3/1988  Japan .

*Primary Examiner*—Tommy P. Chin
*Assistant Examiner*—A. Au
*Attorney, Agent, or Firm*—Kenyon & Kenyon

[57] ABSTRACT

When dot density conversion processing of page data is effected by managing the position, size and data kind of each area for the page data including the portions which are formed as the data of different areas for at least two kinds of data of a plurality of data kinds each having at least one kind such as text data, graphic data, image data, and so forth, dot conversion means disposed for each area in such a manner as to correspond to each data kind is selected and conversion is made so that the result of conversion is drawn at a predetermined output position of each area.

23 Claims, 10 Drawing Sheets

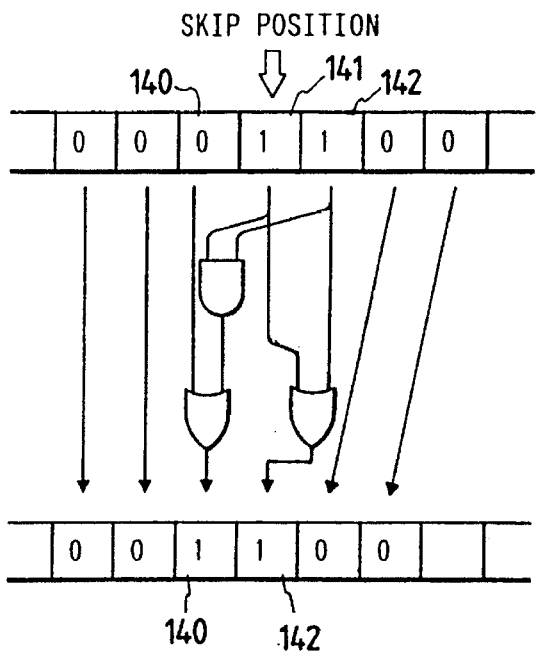
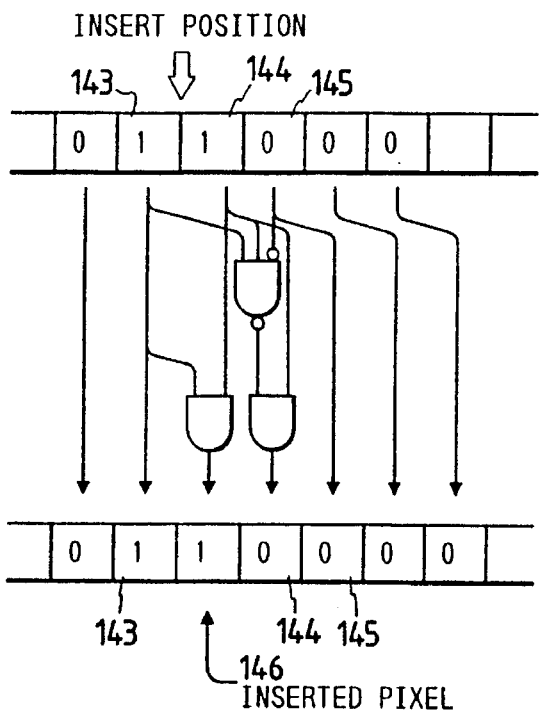
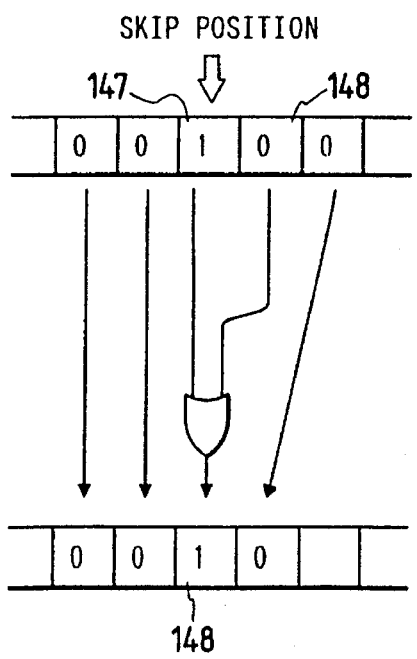
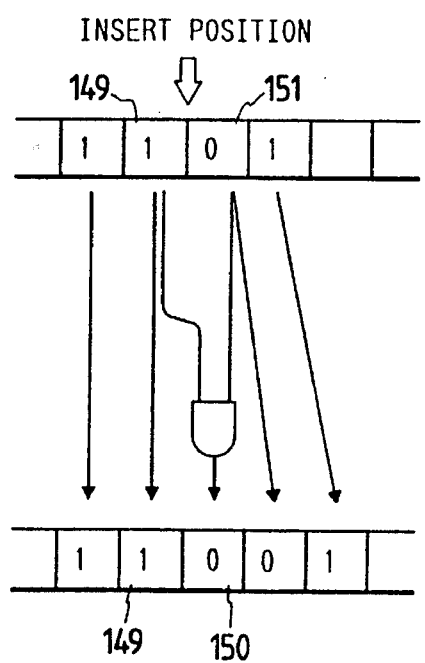

DOT DENSITY CONVERSION METHOD AND SYSTEM

BACKGROUND OF THE INVENTION

1. Field of the Invention

The present invention relates to an information processing apparatus having a dot density conversion function, and more particularly to a dot density conversion method and system suitable when an conversion object consists of at least one image data such as a text, a graphic, an image, or the like.

2. Description of the Related Art

When image data is outputted to an output device in an information processing apparatus handling image data, the image data is converted to a dot density of the output device.

An example of a conventional information processing apparatus having a dot density conversion function is disclosed in Japanese Patent Laid-Open No. 54867/1988. This apparatus stores the inputted image data as the image data of one page and applies dot density conversion to this image data of one page uniformly.

Conventional dot density conversion methods include an SPC (Selective Processing Conversion) method which calculates the distance between a conversion dot and each original dot and uses the value of the closest original dot as the value of the conversion dot when the conversion dot is positioned inside four adjacent original dots, a logical OR method which calculates the value of the conversion dot by the logical OR of the value of each original dot, and the like. Furthermore, there are a method which skips merely the dots at each predetermined intervals, a method which calculates the logical sum with an adjacent dot when the dot is skipped and reflects the value of the dot to be skipped on the adjacent dot, and the like.

However, the prior art technique described above involves the following problems.

The inputted image data consists of dot groups representing the whole page and the dot density conversion processing is effected uniformly for the dots of the whole page. Therefore, degradation of image quality such as the occurrence of moire and a density change occurs at bi-level photographic image portions and irregularity of lines such as the increase and decrease of line widths occurs at graphic portions. Although either the SPC method or the logical "OR" method is capable of obtaining a relatively good conversion result, since the conversion processing is effected for the dots of the whole page, the processing time is increased and a hardware configuration must essentially be employed for the conversion processing to limit the processing time to a practical level. If a simple conversion algorithm such as mere skip of dots is employed to improve the processing time by the software alone, degradation of image quality is unavoidable.

As described above, the conventional methods cannot easily obtain a good conversion result at each portion of a text, a bi-level photographic image, a graphic, etc, that exist in mixture in the image data, and cannot either accomplish practical image quality and a conversion speed by softwares.

SUMMARY OF THE INVENTION

Therefore an object of the present invention is to provide a mechanism which solves these problems with the prior art techniques, which can obtain a good dot density conversion result at each portion of a text, a bi-level photographic image, a graphic, and the like, which can improve a processing speed and which permits selecting a dot density conversion system, whenever necessary.

In a dot density conversion system including a central processing means and a memory means, the present invention obtains data including data of different areas each formed for each of a plurality of data kinds. The present invention also selects dot density conversion means corresponding to the data kind from among a plurality of dot density conversion means. Finally the present invention converts the data of each of the corresponding, different areas by the selected conversion means and if necessary, draws the data of each of the converted area data to a predetermined position.

When the data is the data including a line graphic, the present invention scans the data at least logically, and when the scanning direction crosses a line or lines constituting the line graphic, the present invention converts the dot density in such a manner that a line is not lost for the line having one pixel width and a line having a first line width among a plurality of line widths does not exceed a second line width which is different from the first line width.

The area-wise processing of the present invention in accordance with the data kind described above can be applied in combination with a conventional system by combining it with a uniform dot density conversion system as described below. The uniform dot density conversion system is assumed to be a first dot density conversion system and the area-wise processing system is assumed to be a second dot density conversion system. When a user selects and indicates the first dot density conversion system by an indication means, the first dot density conversion means is selected by a selection means and is initiated by a control means. The first dot density conversion means first reads out area management data from a second memory means. Next, it reads out each corresponding data from a first memory means based on the area management data and draws it on a page. The uniform dot density conversion processing is then carried out throughout the whole page thus drawn.

When the second dot density conversion system is selected and indicated by the indication means, the selection means selects the second dot density conversion means, which is started by the control means. The second dot density conversion means reads out the area management data from the second memory means and forms the image for one page by conducting the following processing for each area. First, the data corresponding to each area is read out from the first memory means. Next, the selection means selects the corresponding dot density conversion means, which is then started by the control means for executing dot density conversion. The converted data is drawn at the designated position on the page described in the area management data.

The foregoing and other objects, advantages, manner of operation and novel features of the present invention will be understood from the following detailed description when read in connection with the accompanying drawings.

BRIEF DESCRIPTION OF THE DRAWINGS

FIGS. 7(a)–7(d) are explanatory views relating to a page dot density conversion processing;

DETAILED DESCRIPTION

Hereinafter, an embodiment of the present invention will be explained referring to the accompanying drawings. Incidentally, this embodiment represents the application of dot density conversion to print-out processing of a word processor.

Figure 8:
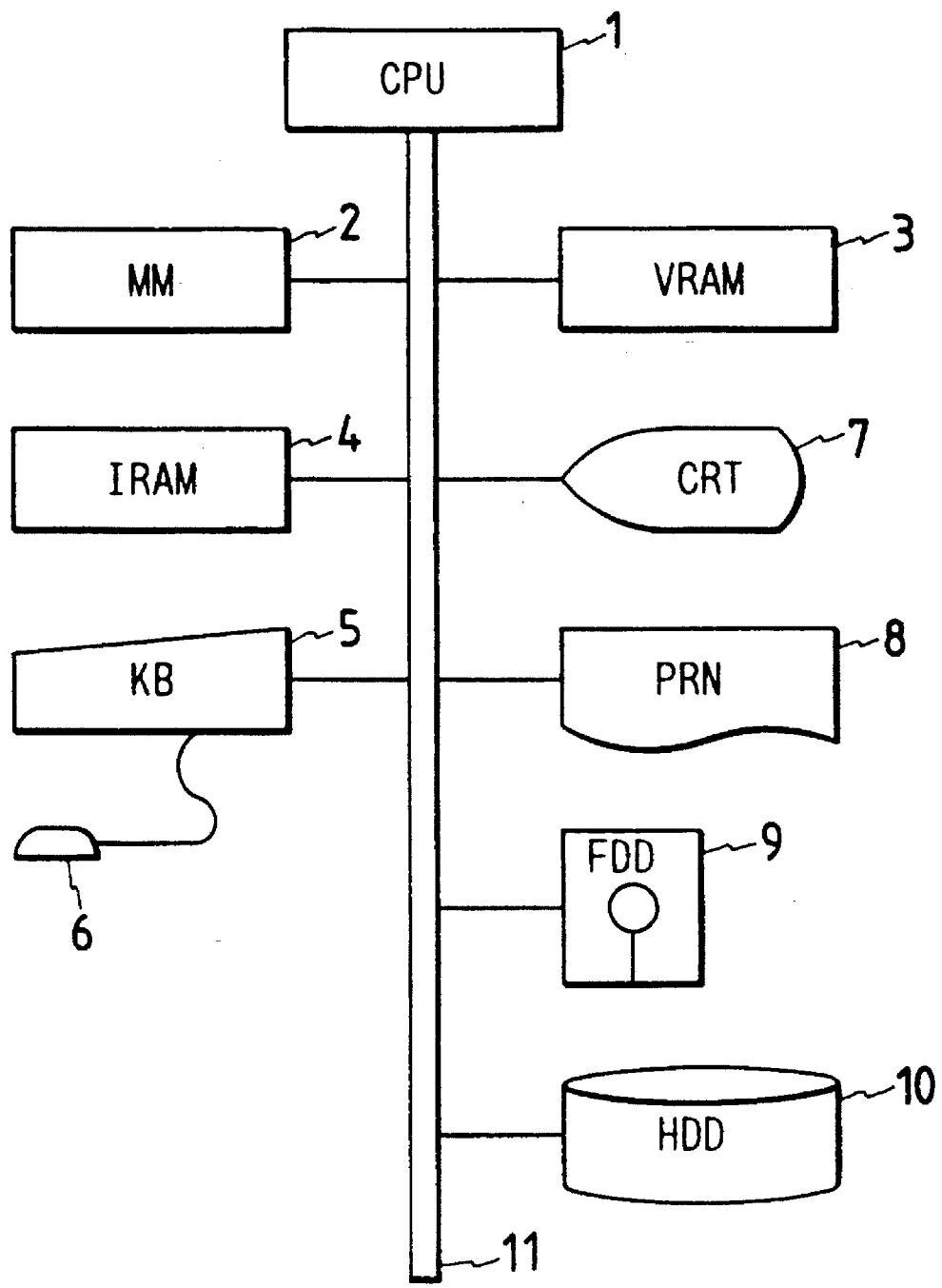
FIG. 8 is a structural view of hardware configuration of the word processor in accordance with the present invention.

FIG. 8 shows a hardware construction of a word processor in accordance with the present invention. Reference numeral 1 represents a central processing unit, which executes various programs associated with document edition inclusive of dot density conversion processing and controls peripheral equipment. Reference numeral 2 represents a main memory, which stores processing programs associated with document edition and data associated with the former. Reference numeral 3 represents a video memory (VRAM), whose content is displayed on a display 7. Reference numeral 4 represents an image memory (IRAM), which stores one page of image data for the output from a printer (PRN) 8. Instructions of edition of documents and printing are effected through a keyboard (KB) 5 and a mouse 6. The display 7 (CRT), displays a picture surface for the document edition work. The printer 8 outputs pixel data of documents and the like stored in the image memory 4. The printer 8 has various dot densities.

Reference numeral 9 represents a floppy disk drive (FDD), which reads out and preserves document data from and into the floppy disk. Reference numeral 10 represents a hard disk device (HDD), which reads out and preserves programs associated with document edition and the document data. Reference numeral 11 represents a bus for the data transfer between these peripheral equipment 2–10 and the central processing unit 1.

Figure 9:
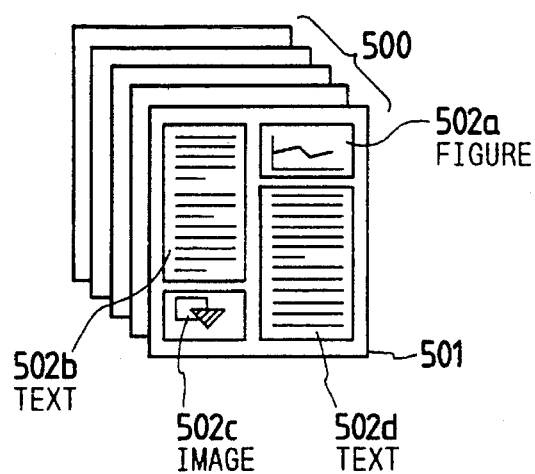
FIG. 9 is a structural view of a document in the word processor in accordance with the present invention.

FIG. 9 shows an example of the structure of a document dealt with by the word processor of this embodiment. A document 500 consists of a plurality of pages and a page 501 consists of at least one area 502a, b, c and d. The areas include text, graphic representations and images, and a plurality each of texts, graphic representations and images may exist, too. Hereinafter, such different types of data will be referred to as simply "data kinds".

Figure 10A:
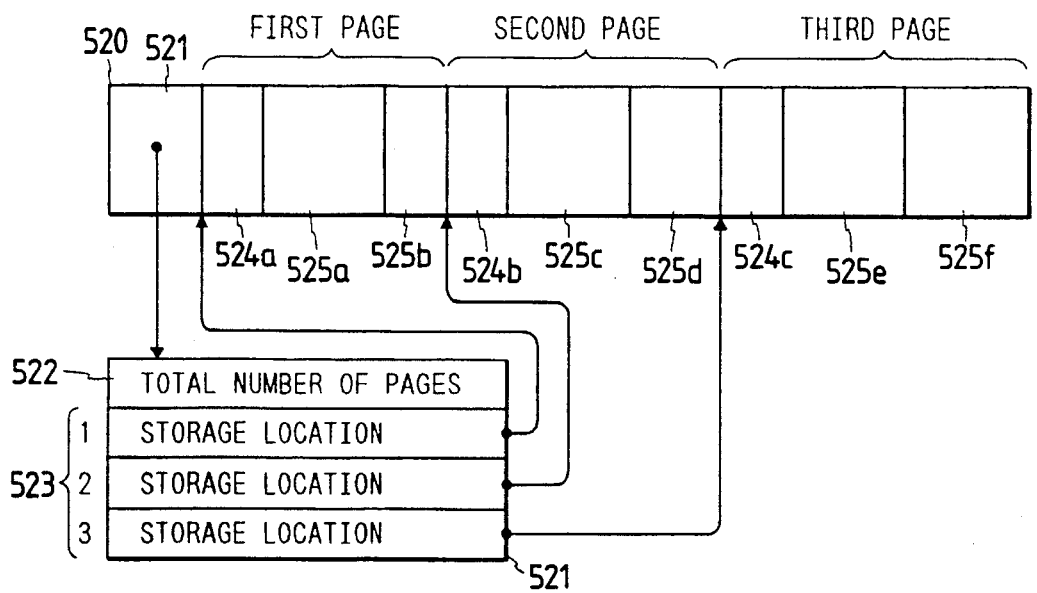
FIGS. 10(a) and 10(b) are structural views of the document data in the word processor in accordance with the present invention.

FIG. 10(a) shows an example of the structure of document data. The document data 520 consists of a page management table 521, area management tables 524a through 524c for each page and each of the area data 525a through 525f.

A total number of pages 522 and a storage location 523 of each page on the document data 520 of the area management table 524 are described on the page management table 521. These storage locations 523 are described by an offset quantity from the leading part of the document data 520.

Figure 10B:
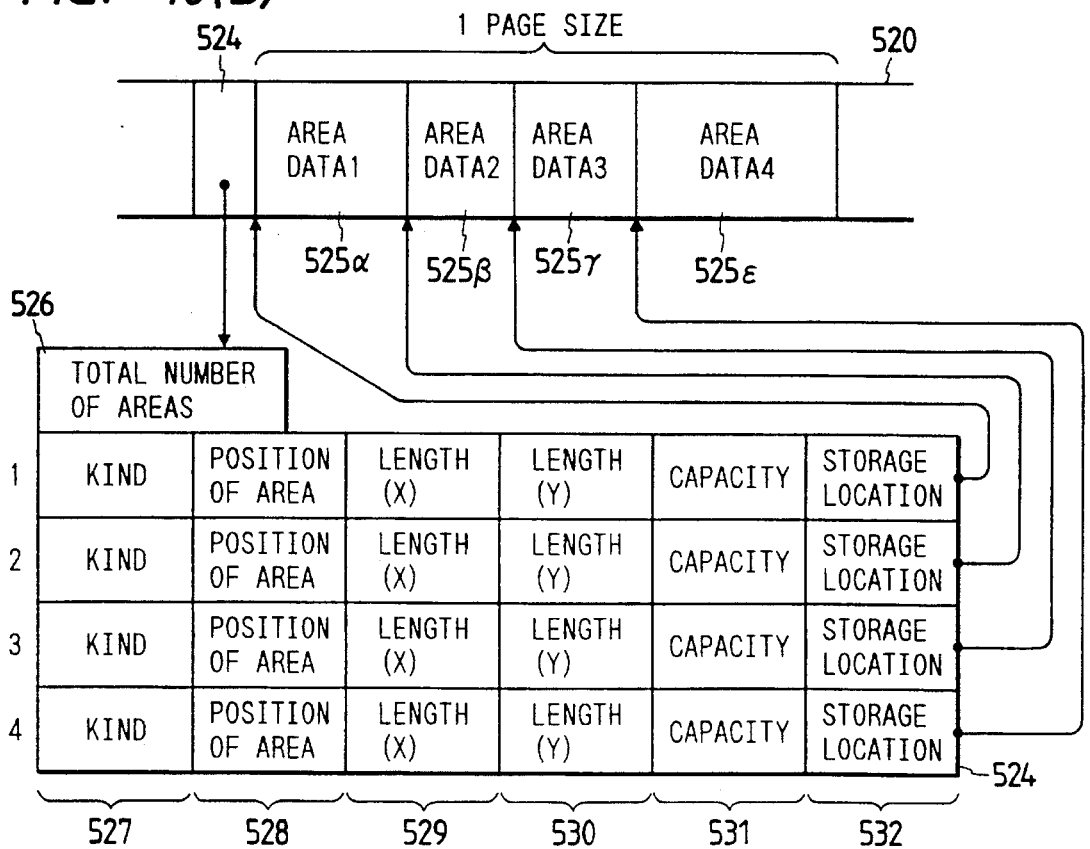

As shown in FIG. 10(b), the total number of areas 526 existing in that page and data on each area are described on the area management table 524. The data on each area includes the kind of area 527, a position of area 528, a horizontal length 529 of the area, a vertical length 530 of the area, a capacity of the area data 525 and the storage location 532 of that area data 525 on the document data 520. Incidentally, the storage location 532 is described by the offset quantity from the leading part of the document data 520. The positions of areas 528 represent the positions of the left upper end points of the areas 502a through 502d inside the page 501 shown in FIG. 9 with the left upper end point of this page 501 being the origin.

Next, the structure of each area data 525 will be explained. The structure of the area data 525 is based on the kind of the area.

Figure 11:
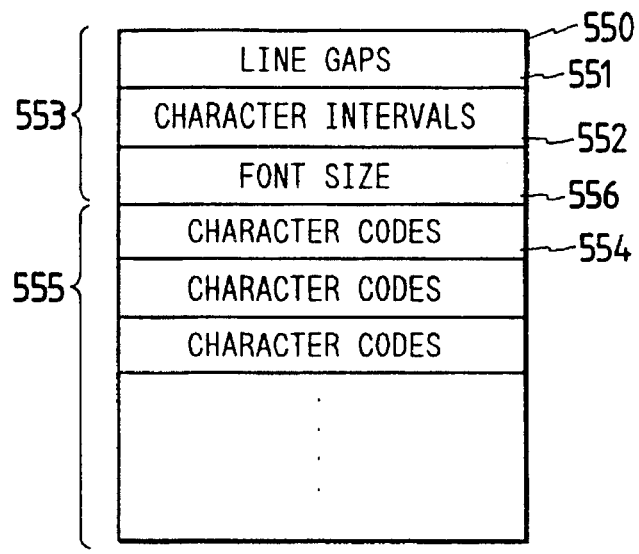
FIG. 11 shows an example of text area data.

FIG. 11 shows the area data of the area whose kind is a text (hereinafter referred to as the "text area data"). The text area data 550 includes a control data part 553 consisting of line gaps 551, character intervals 552 and a font size 556, and a character data part 555 consisting of the aggregate of character codes 554 representing each character.

Figure 12:
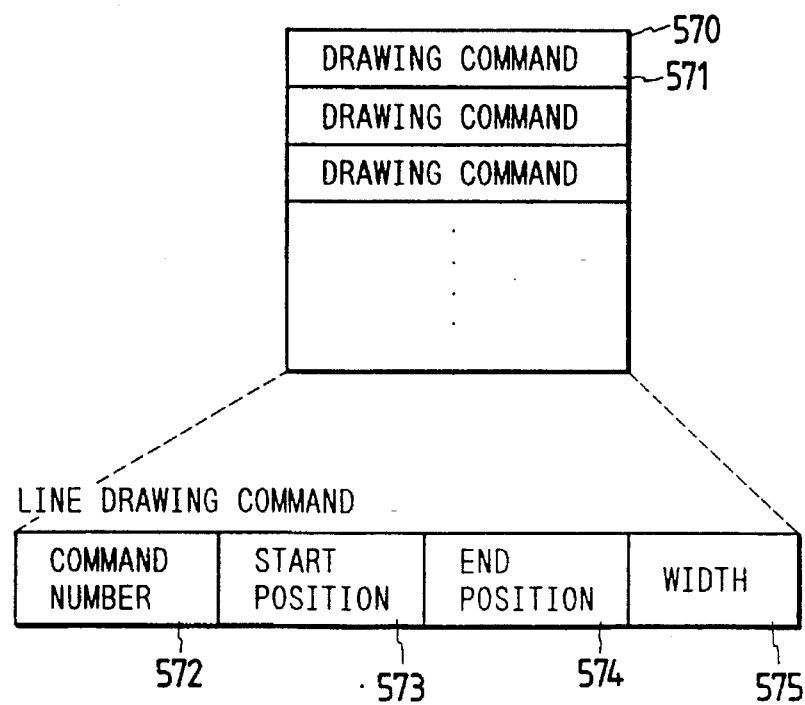
FIG. 12 shows an example of image area data.

FIG. 12 shows the structure of the area data of the area whose kind is a graphic (hereinafter referred to as the "graphic area data"). The graphic area data 570 consists of the aggregate of drawing commands 571 such as line drawing command, circle drawing command, and the like. The command 571 for drawing a line, for example, consists of a command number 572 representing that a line is to be drawn, a drawing start position 573, a drawing end position 574 and a line width 575. The drawing start and end positions 573, 574 in each drawing command 571 are described with the left upper point of the area defined by the line.

Figure 13:
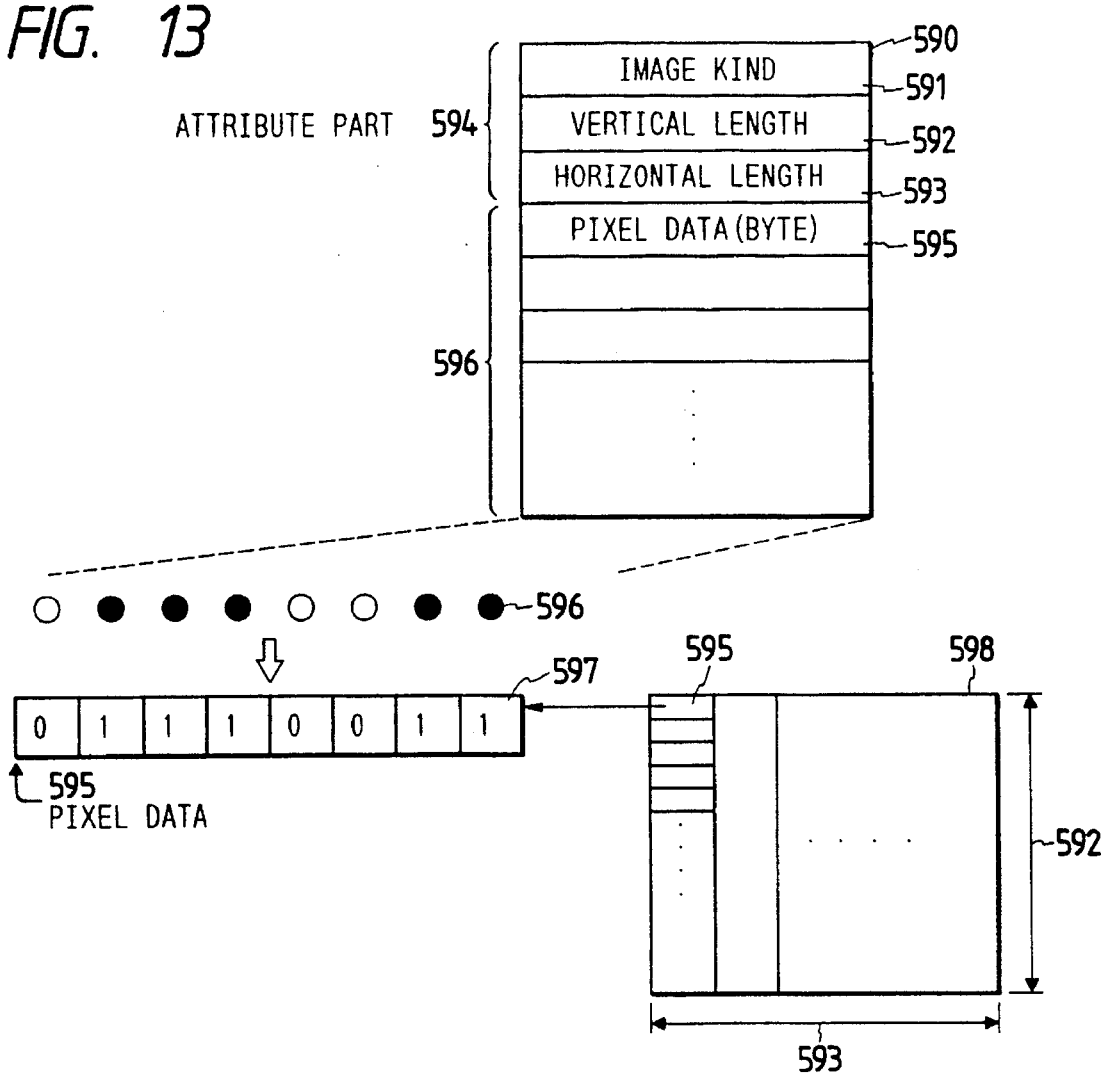
FIG. 13 shows an example of image area data.

FIG. 13 shows the structure of the area data of the area whose kind is the image (hereinafter referred to as the "image area data"). The image area data 590 consists of an image attribute part 594 describing an image kind 591, a vertical length 592 and a horizontal length 593 by the number of bytes, and a data part 596 consisting of the aggregate of pixel data 595 expressing one pixel 596 by one bit 597. A bit having a binary value "1" represents a black pixel and "0" represents a white pixel. The image data 595 of one byte represents the value of eight pixels which are continuous in the horizontal direction and corresponds to the image area 598 as shown in the drawing. Whether or not a bi-level graphic image is described in the image kind 591 is determined. If the image kind is a bi-level graphic image, it is expressed by a dither matrix of 4×4 pixels in the case of the bi-level graphic image.

Figure 14:
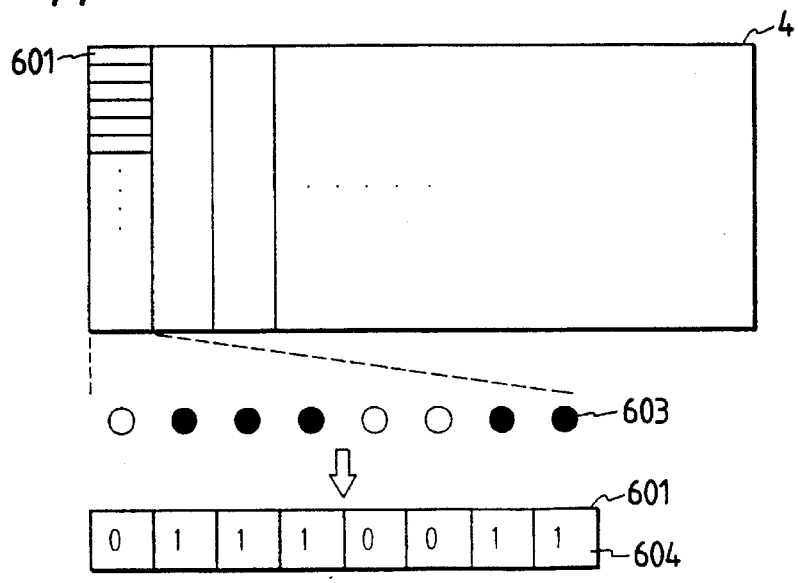
FIG. 14 shows the structure of an image memory.

FIG. 14 shows the structure of the image memory. The image memory 4 is a memory of a bit map system which expresses one pixel 603 by one bit 604 in the same way as the image area data 598 shown in FIG. 13 and consists of the aggregate of pixel data representing eight pixels with one byte. It can store pixel data for one page of the printer 8 connected to the word processor of this embodiment.

Next, dot density conversion processing of the word processor of this embodiment having the system configuration described above will be explained referring to FIG. 1. The central processing unit 1 executes the processing which draws the document data 520 stored in the hard disk device 10 in such a manner as to correspond to the designated dot density in the dot density conversion processing 100.

The dot density conversion systems that can be conducted by the word processor of this embodiment include an area-wise conversion system which draws the data on the image memory 4 after the dot density conversion processing is conducted for each area and obtains a high quality dot density conversion result, and a page conversion system which draws all the areas of one page on the image memory 4 and then carries out exclusively a high speed and simple algorithm dot density conversion processing.

First, in the input processing 101, the dot density conversion processing 100 accepts the input command for selecting the area-wise conversion system or the page conversion system, the intended dot density of the printer 8 and the page number to be converted. Incidentally, the dot density corresponding to the connected printer 8 is automatically designated by the central processing unit 1. Next, the page management table 521 is read out by the page management table read-out processing 103 so as to acquire the storage locations 523 of the area management tables 524 corresponding to the designated page number. The area management tables 524 are then read out from the storage location by the area management table read-out processing 104. Next, if the area-wise conversion system is designated by the input processing 101, the dot density conversion processing 106–108 corresponding to the area kind 527 is carried out for each area described in the area management table 524. If the area kind 527 is the text, the text data dot density conversion processing 106 is carried out. Similarly, if the area kind 527 is the graphic and if it is the image, the graphic data dot density conversion processing 107 and the image data dot density conversion processing 108 are carried out, respectively. Each dot density conversion processing 106–108 corresponding to each area kind 527 will be described in detail. If the page conversion system is designated in the input processing 101, the page dot density conversion processing 109 is carried out. The page dot density conversion processing 109 will be described in further detail.

Figure 1:
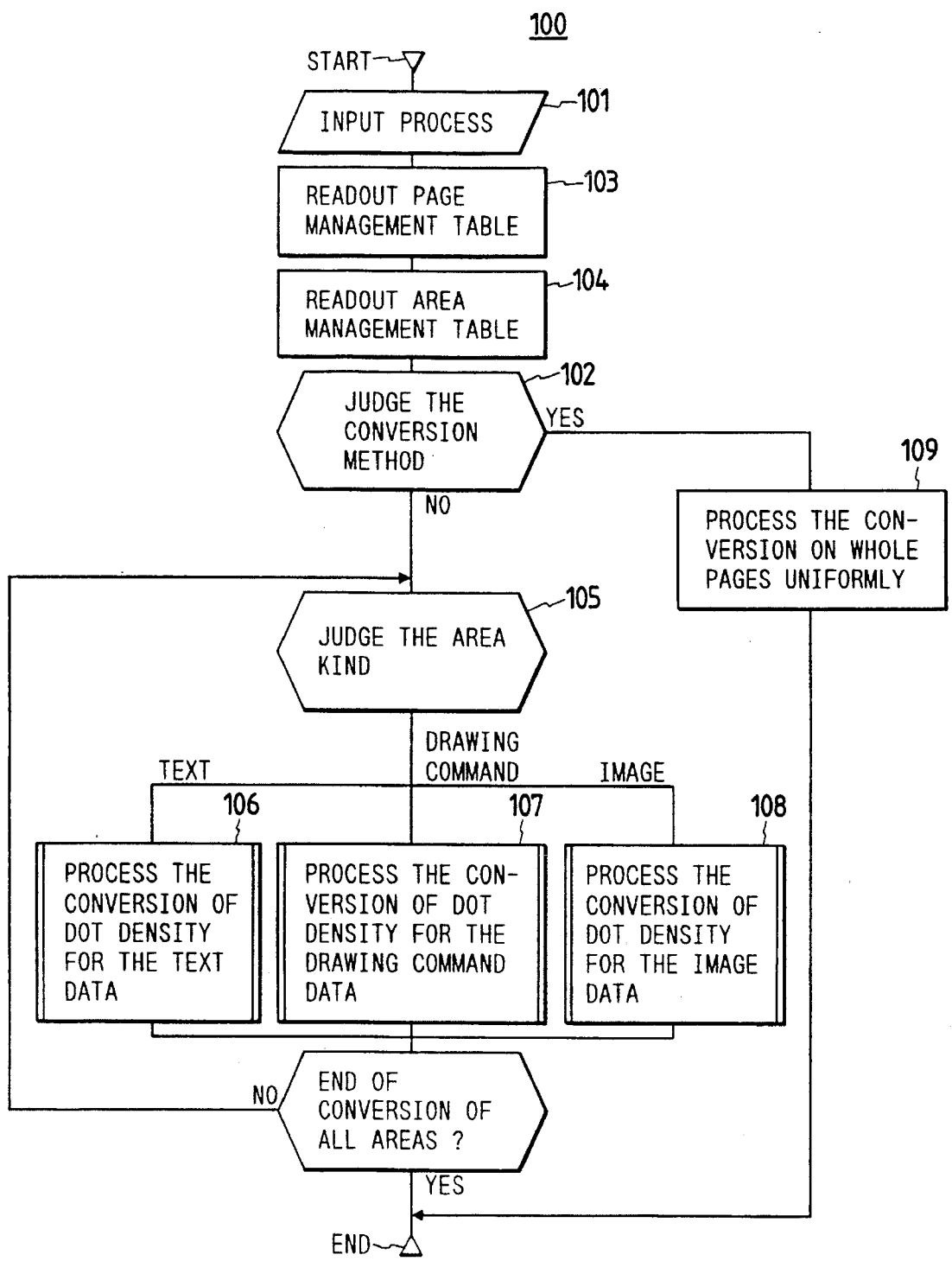
FIG. 1 is an explanatory view useful for explaining a processing when the present invention is applied to a dot density conversion processing of a word processor.
Figure 2A:
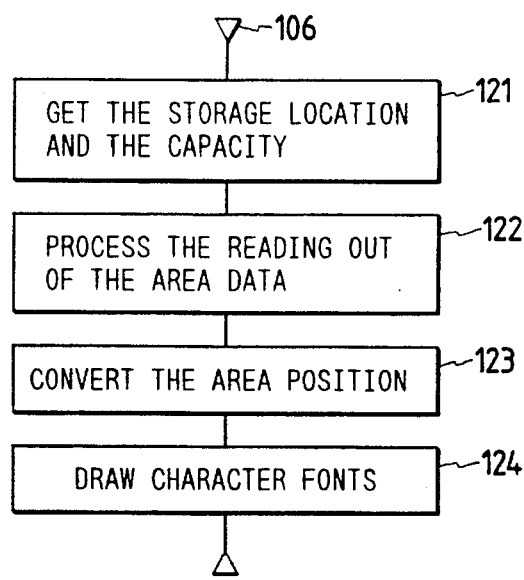
FIGS. 2(a) and 2(b) show an embodiment of a text data dot density conversion processing in accordance with the present invention.
Figure 2B:
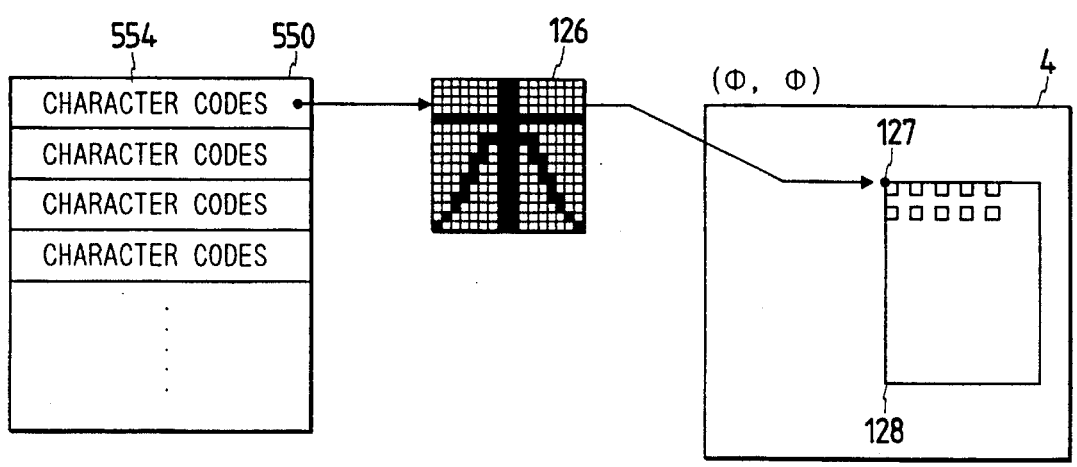

Next, in FIG. 2(a), the text data dot density conversion processing 106 will be explained. First, the storage location 532 and the capacity 531 of the area data 525 are acquired (121) from the area management table 524 and the area data 525 is read out from the area data read-out processing 122. The area position 528 described on the area management table 524 is converted (123) to the position 127 of the pixel on the image memory 4 as shown in FIG. 2(b). If the area position 528 described on the area management table 524 is (Xs, Ys) and the dot density per unit length designated in the input processing 101 shown in FIG. 1 is b, the area position 127 expressed by the pixel number on the image memory 4 is (b×Xs, b×Ys). Next, each character code 554 described on the text area data 550 is drawn on the image memory 4 (124) by use of the corresponding character font 126. If the font having the same size as the character font size 556 described in the attribute part 553 (FIG. 11) of the text area data 550 is prepared in advance, this character font 126 is as such drawn on the image memory 4. If the font of the character font size 556 is not prepared, the character size 126 which is prepared is either enlarged or diminished and is then drawn on the image memory 4. The position of the image memory 4 on which the character font 126 is drawn is determined by the line gaps 551 and character intervals 552 that are described in the attribute part 553 of the text area data 550. A well known method using pixel-matrix is used to enlarge or diminish the character font 126.

Figure 3A:
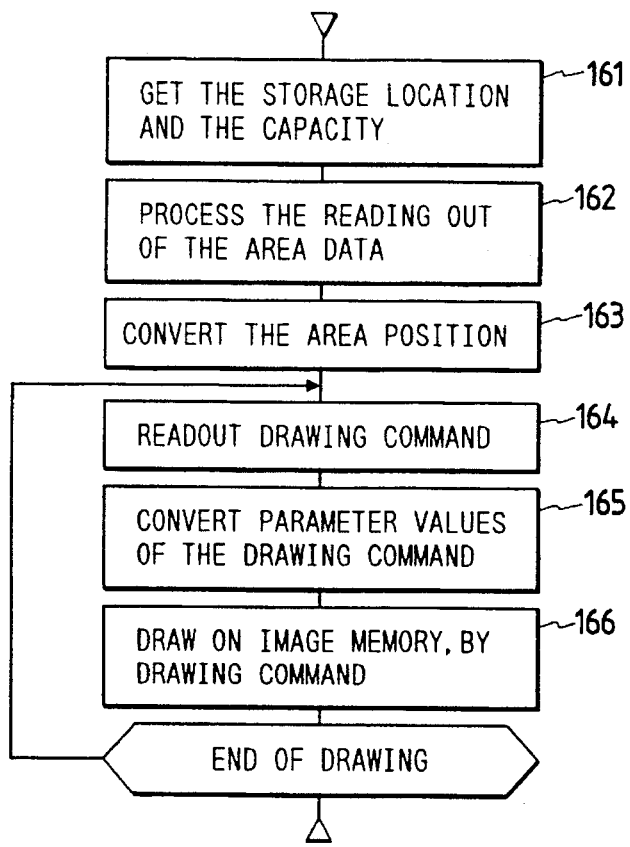
FIGS. 3(a) and 3(b) show an embodiment of a graphic data dot density conversion processing in accordance with the present invention.
Figure 3B:
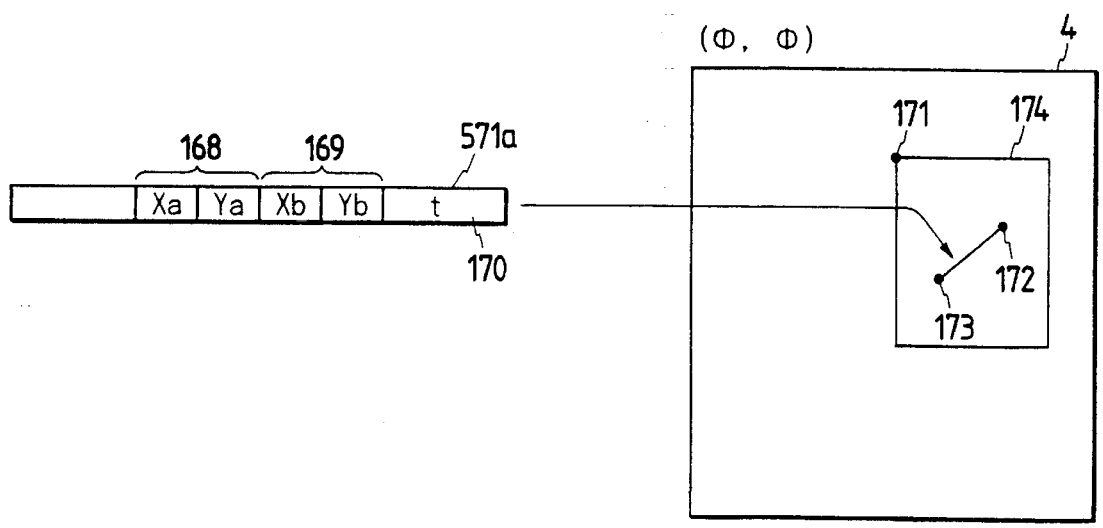

Next, in FIG. 3(a), the graphic data dot density conversion processing 107 will be explained. First, the storage location 532 of the area data 525 and its capacity 531 are acquired (161) from the area management table 524 and the graphic area data 525 is read out by the area data read-out processing 162. As shown in FIG. 12, the graphic area data 570 consists of the aggregate of drawing commands 571. The area position 528 described on the area management table 524 is converted to the position 171 of the pixel (163) on the image memory 4 in the same way as in the text data dot density conversion processing 106 (see FIG. 3b). Next, each drawing command 571 is read out sequentially (164), parameters 168–170 of the drawing command 571 are calculated (165) in such a manner as to correspond to the dot density designated by the input processing 101 and the drawing command is drawn as the pixels on the image memory 4 (166). In the case of the line drawing command shown in FIG. 3(b), for example, if the drawing start point 168 is (Xa, Ya), the drawing end point 169 is (Xb, Yb), the line width 170 is t, the area position 528 is (Xs, Ys) and the designated dot density per unit length is b, then, the positions of the pixels 171–173 on the corresponding image memory 4 are (b×Xs, b×Ys) for the area position 171, (b×Xs+b×Xa, b×Ys+b×Ya) for the drawing start position 172, (b×Xs+b×Xb, b×Ys+b×Yb) for the drawing end position 173 and b×t for the line width.

Figure 4A:
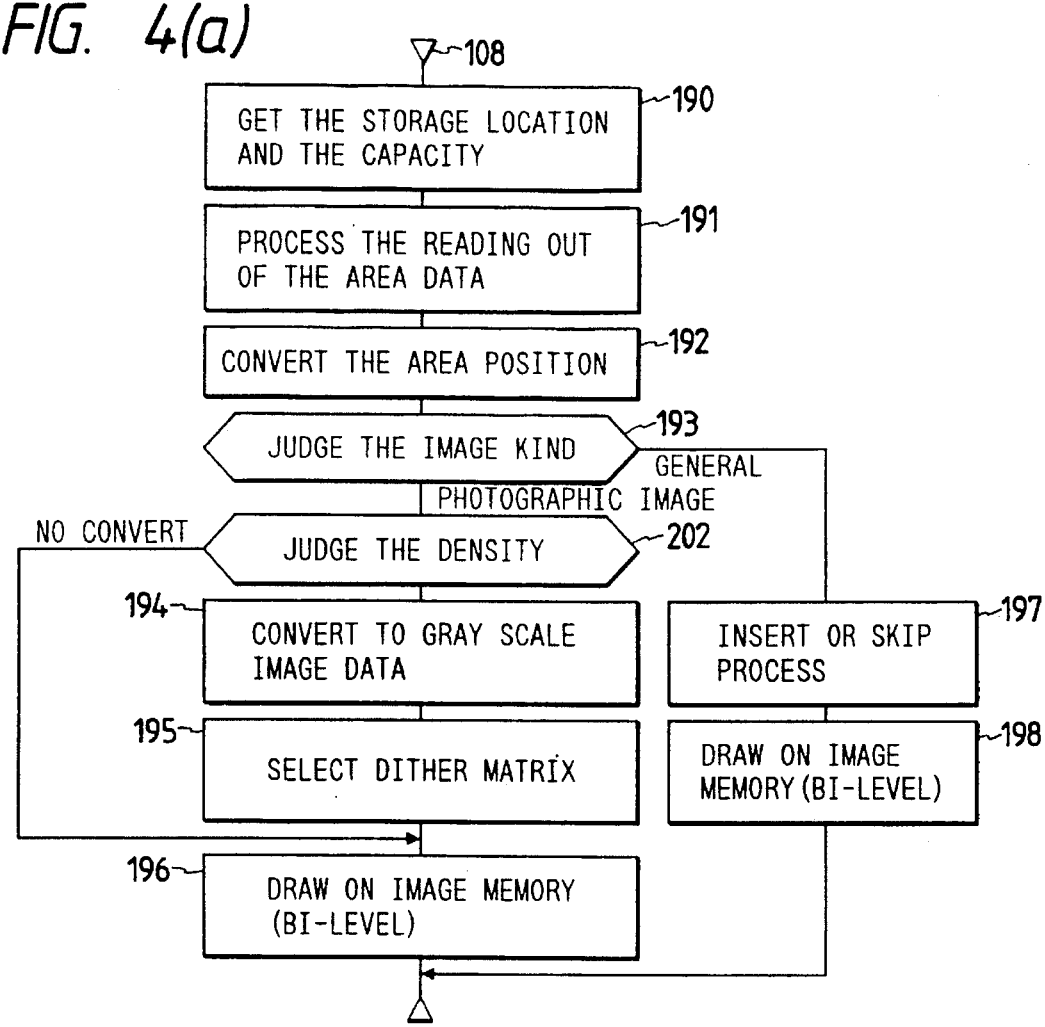
FIGS. 4(a) and 4(b) show an example of an image data dot density processing in accordance with the present invention.

Next, the image data dot density conversion processing 108 will be explained referring to FIGS. 4(a), 4(b), 5(a) and 5(b). In FIG. 4(a), first, the storage location 532 of the area data 525 and its capacity 531 are acquired (190) from the area management table 524 and the area data 525 is read out by the area data read-out processing 191. If the area position 532 is (Xs, Ys) and the dot density per unit length designated in the input processing 101 shown in FIG. 1 is b, the area position represented by the pixel number becomes (b×Xs, b×Ys).

Figure 4B:
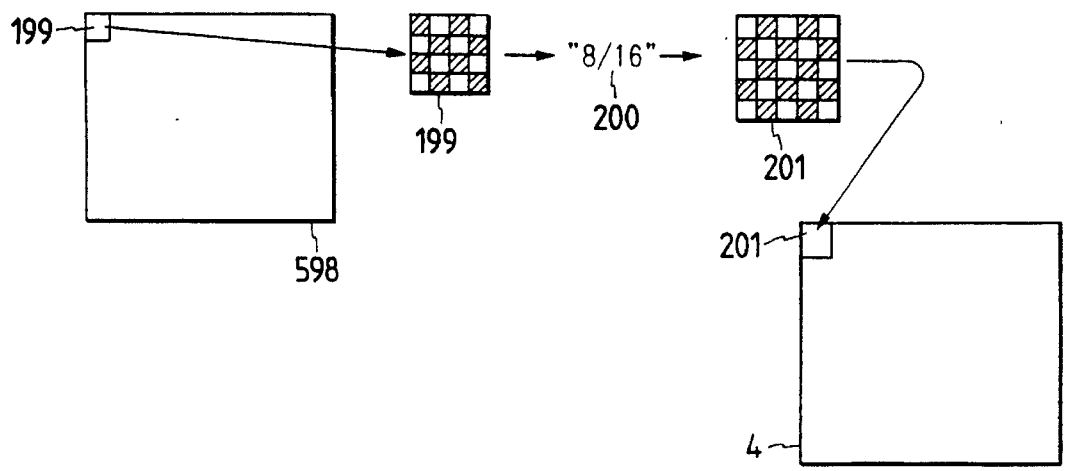

Next, the image kind 591 described in the attribute part 594 of the image area data 590 (FIG. 13) is judged (193) and the corresponding dot density conversion processing is conducted. First, the case where the image kind 591 is the bi-level photographic image will be explained referring to FIG. 4. The pixel data 595 described in the image area data 590 are assumed to be outputted at the dot density a. If a and b are equal when the dot density designated by the input processing 101 is b (202), the image area data 598 is as such drawn on the image memory 4 (196). If a and b are not equal to each other (202), the image area data 598 is first divided into small areas 199 of 4×4 pixels as shown in FIG. 4(b), the number of black pixels in each small area is counted and is used as the tone wedge value 200 in that small area (194). Next, this tone wedge value 200 is expressed by use of the dither matrix 201 of (4×b/a)×(4×b/a) and drawn on the image memory 4 (196).

Figure 5A:
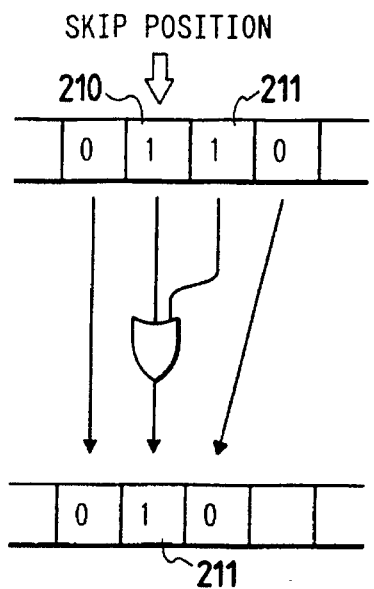
FIGS. 5(a) and 5(b) are explanatory view relating to an image data dot density conversion processing.
Figure 5B:
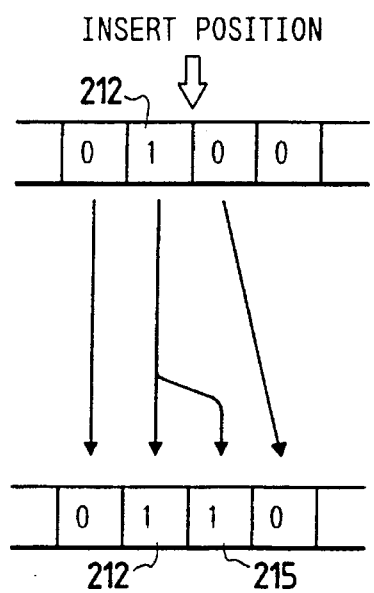

Next, the case where the image kind 591 is not the bi-level photographic image will be explained with reference to FIG. 5(a) and 5(b). Although the case where the pixels are inserted or skipped with predetermined intervals in the horizontal direction will be described, this process is the same for the vertical direction. The image data 595 of the image area data 590 shown in FIG. 13 is assumed to be with the dot density a and the dot density designated by the input processing is b. Then, if a>b, one pixel is skipped for pixels a/(a–b). If b>a, one pixel is inserted for pixels a/(b–a). If dot density conversion is made by skipping the pixels, the value of the pixel 211 next to the right of the pixel 210 to be skipped is determined by calculating its logical OR with the pixel 210 to be skipped as shown in FIG. 5(*a*) to minimize any loss of the information of the pixel 210 to be skipped. When dot density conversion is made by inserting the pixels, the value of the pixel 215 to be inserted uses the value of the pixel 212 next to the left of the insertion position as shown in FIG. 5(*b*). Insertion or skipping of the pixel is carried out in the manner described above (197) and the data is drawn from the area position on the image memory (198).

Figure 6:
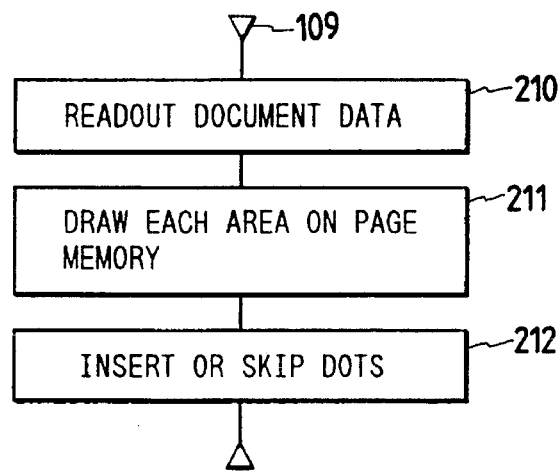
FIG. 6 shows an embodiment of a page dot density conversion processing in accordance with the present invention.

Next, the page dot density conversion processing 109 will be explained referring to FIGS. 6 and 7. First, the storage location 532 of the area data 525 and its capacity 531 are acquired for each area from the area management table 524 and the area data 525 are read out (210), and then drawn on the image memory 4 without applying dot density conversion (211). Next, the image data drawn on the image memory 4 is assumed to be outputted with the dot density a. If the dot density designated by the input processing 101 shown in FIG. 1 is b, one pixel is skipped for the pixels a/(a–b) if a>b, and one pixel is inserted for the pixels a/(a–b) if b>a (212). The character font prepared for the word processor of this embodiment has one pixel (i.e. a "1" pixel) for the line width of the line in the standard horizontal direction and two pixels (i.e. two 1 pixels) for the line width of the line in the standard vertical direction, and the character drawn as the pixel data in 211 on the image memory 4 has such line widths. Accordingly, when dot density conversion is made by skipping the pixel, conversion is made so that the line in the horizontal direction does not disappear and the line in the vertical direction having the line width of up to two pixels keeps its line width. When dot density conversion is made by inserting the pixel, conversion is made so that the line in the horizontal direction having the line width of one pixel keeps its line width and the line in the vertical direction having the line width of up to two pixels keeps its line width. Hereinafter, the case where the pixels are skipped with a predetermined interval will be first explained and then the case where the pixels are inserted with a predetermined interval will then be explained.

First, the processing for dot density conversion by skipping the pixels at each predetermined intervals in the horizontal direction will be explained referring to FIG. 7(*a*). The value of the pixel 140 next to the left of the pixel 141 to be skipped is determined by calculating the logical AND between the value of the pixel 142 next to the right of the pixel 141 to be skipped and the value of the pixel 141 to be skipped and then calculating the logical OR of pixel 140 with the product thus obtained. The value of the pixel 142 next to the right of the pixel 141 to be skipped is determined by calculating the logical OR with the pixel 141 to be skipped.

Next, the processing for dot density conversion by skipping the pixels at each predetermined intervals in the vertical direction will be explained referring to FIG. 7(*c*). The value of the pixel 148 next to the pixel 147 to be skipped is determined by the logical OR with the value of the pixel 147 to be skipped.

Next, the processing for dot density conversion by inserting the pixels at each predetermined intervals in the horizontal direction will be explained referring to FIG. 7(*b*). The value of the pixel 146 to be inserted is determined by calculating the logical AND between the pixels 143 and 144 on both sides of the insertion position. The value of the pixel 144 on the right of the insertion position is determined by: calculating the logical AND between the inverted value of the pixel 145 second next on the right of the insertion position, the value of the pixel 144 next to the right of the insertion position, and the value of the pixel 143 on the left of the insertion position; inverting this calculated value; and calculating the logical "AND" between the inverted calculated value and the pixel 144 to the right of the insertion position.

Next, the processing for dot density conversion by inserting time pixels at each predetermined intervals in the vertical direction will be explained referring to FIG. 7(*d*). The value of the pixel 150 to be inserted is determined by the logical AND between the values of the pixels 149, 151 on both sides of the insert position.

In accordance with this embodiment, when the area-wise conversion system is designated, the dot density conversion processing 100 executes the dot density conversion processing 106–108 corresponding to the area kind for each area and when time page conversion system is designated, it draws the whole areas of one page on the image memory 4 and then executes the dot density conversion processing 109. Incidentally, the text data dot density conversion processing 106 corresponding to the text area uses the character font when the size of the character after conversion is the same as, the character font prepared in advance. Otherwise, the character font prepared in advance is enlarged or diminished and then drawn on the image memory 4. In this manner, excellent dot density conversion results can be obtained at each portion of the text, image, graphic, etc. Further, the conversion processing can be improved and the user can select the dot density conversion systems, whenever necessary.

As described above, when dot density conversion of the image consisting of at least one data such as the text, the graphic, the image, and the like, is made, the present invention executes the optimum dot density conversion processing for each area. There, the present invention can prevent the occurrence of moire at the portions of the bi-level photographic images and degradation of image quality such as the density change and irregularity can increase and decrease of lines at the graphic portion and can improve the conversion processing speed. Furthermore, the present invention provides a mechanism which enables the user to select the dot density conversion system, whenever necessary.

What is claimed is:

1. A dot density conversion method comprising the steps of:

(a) obtaining a string of three binary pixels from part of at least one of (i) text data, (ii) a bi-level photographic image, and (iii) a graphic, said string of three binary pixels comprising a number of "1" pixels which must be maintained as "1" pixels, said number being less than three; and (b) converting the obtained string of three binary pixels into four binary pixels by inserting a fourth binary pixel, comprising:

(i) supplying an inverted value of a first one of said three binary pixels to a first input of a NAND logic, (ii) defining a value of a first one of said four binary pixels as the value of said first one of said three binary pixels;

(iii) supplying a second one of said three binary pixels to a first input of a first AND logic, to a second input of said NAND logic, and to a first input of a second AND logic;

(iv) supplying a third one of said three binary pixels to a second input of said second AND logic, to a third input of said NAND logic;

(v) supplying an output of said NAND gate to a second input of said first AND logic;

(vi) defining the value of a second one of said four binary pixels as the output of said first AND logic;

(vii) defining the value of a third one of said four binary pixels as the value of said third one of said three binary pixels; and (viii) defining the value of said fourth binary pixel inserted between said second one of said four binary pixels and said third one of said four binary pixels, as the output of said second AND logic.

2. A dot density conversion apparatus comprising:

(a) means for obtaining a string of three binary pixels from part of at least one of (i) text data, (ii) a bi-level photographic image, and (iii) a graphic, said string of three binary pixels comprising a number of "1" pixels which must be maintained as "1" pixels, said number being less than three;

(b) means for selecting one of (i) a first conversion means for converting said string of three binary pixels into four binary pixels by inserting a pixel and (ii) a second conversion means for converting said string of three binary pixels into two binary pixels by skipping one of said three binary pixels;

(c) said first conversion means comprising means for defining a first one of said three binary pixels as the value of said first one of said four binary pixels and a third one of said three binary pixels as the value of said third one of said four binary pixels, a NAND logic (i) receiving an inverted value of said first one of said three binary pixels at a first input, (ii) receiving a second one of said three binary pixels at a second input of said NAND logic, and (iii) receiving said third one of said three binary pixels at a third input of said NAND logic, a first AND logic (i) receiving said second one of said three binary pixels at a first input, (ii) receiving an output of said NAND logic at a second input, and (iii) outputting an output of said first AND logic as the value of a second pixel of said four binary pixels, and a second AND logic (i) receiving said second one of said three binary pixels at a first input, (ii) receiving a third one of said three binary pixels at a second input, and (iii) outputting an output of said second AND logic as the value of the pixel inserted between said second one of said four binary pixels and said third one of said four binary pixels;

(d) said second conversion means comprising an AND logic (i) receiving a first one of said three binary pixels at a first input of said AND logic, and (ii) receiving a second one of said three binary pixels at a second input, a first OR logic (i) receiving said first one of said three binary pixels at a first input, and (ii) receiving said second one of said three binary pixels at a second input, an output of said first OR logic defining the value of a first one of said two binary pixels and a second OR logic (i) receiving an output of said AND logic at a first input of said OR logic, and (ii) receiving a third one of said three binary pixels at a second input, an output of said second OR logic defining a value of a second one of said two binary pixels.

3. A dot density conversion apparatus comprising:

(a) means for converting a string of three binary pixels from part of at least one of (i) text data, (ii) a bi-level photographic image, and (iii) a graphic, to four binary pixels, said string of three binary pixels comprising a number of "1" pixels which are to be maintained as "1" pixels, said number being less than three;

(b) a NAND logic (i) receiving an inverted value of a first one of said three binary pixels at a first input, (ii) receiving a second one of said three binary pixels at a second input of said NAND logic, and (iii) receiving a third one of said three binary pixels at a third input of said NAND logic;

(c) a first AND logic (i) receiving said first one of said three binary pixels at a first input, (ii) receiving an output of said NAND logic at a second input, and (iii) outputting an output of said first AND logic as the value of a second one of said four binary pixels;

(d) a second AND logic (i) receiving said second one of said three binary pixels at a first input, (ii) receiving a third one of said three binary pixels at a second input, and (iii) outputting an output of said second AND logic as a value of a fourth pixel inserted into said string of three binary pixels;

(e) means for defining the value of a first one of said four binary pixels as the value of said first one of said three binary pixels; and (f) means for defining the value of a third one of said four binary pixels as the value of said third one of said four binary pixels.

4. A dot density conversion method comprising the steps of:

(a) obtaining a string of three binary pixels from part of at least one of (i) text data, (ii) a bi-level photographic image, and (iii) a graphic, said string of three binary pixels comprising a number of "1" pixels which must be maintained as "1" pixels, said number being less than three; and (b) converting the obtained string of three binary pixels into two binary pixels by skipping one of said three binary pixels, comprising:

(i) supplying a first one of said three binary pixels to a first input of an AND logic, (ii) supplying a second one of said three binary pixels to a second input of said AND logic, (iii) supplying said first one of said three binary pixels to a first input of a first OR logic, (iv) supplying said second one of said three binary pixels to a second input of said first OR logic, (iv) defining the value of a first one of said two binary pixels as the value of the output of said first OR logic, (vi) supplying said output of said AND logic to a first input of a second OR logic, (vii) supplying a third one of said three binary pixels to a second input of said second OR logic, and (viii) defining the value of a second one of said two binary pixels as the value of the output of said second OR logic.

5. A dot density conversion apparatus comprising:

(a) means for converting a string of three binary pixels from part of at least one of (i) text data, (ii) a bi-level photographic image, and (iii) a graphic, into two binary pixels, said string of three binary pixels comprising a number of "1" pixels which must be maintained as "1" pixels, said number being less than three;

(b) an AND logic (i) receiving a first one of said three binary pixels at a first input and (ii) receiving a second one of said three binary pixels at a second input;

(c) a first OR logic (i) receiving said first one of said three binary pixels at a first input, and (ii) receiving said second one of said three binary pixels at a second input, an output of said first OR logic defining the value of a first one of said two binary pixels; and (d) a second OR logic (i) receiving an output of said AND logic at a first input, and (ii) receiving a third one of said three binary pixels at a second input, an output of said second OR logic defining the value of a second one of said two binary pixels.

6. A dot density conversion method comprising the steps of:

(a) obtaining a string of three binary pixels from part of at least one of (i) text data, (ii) a bi-level photographic image, and (iii) a graphic, said string of three binary pixels comprising a number of "1" pixels which are to be maintained as "1" pixels, said number being less than three;

(b) selecting one of (i) a first conversion method for converting said string of three binary pixels into four binary pixels by inserting a pixel and (ii) a second conversion method for converting said string of pixels into two binary pixels by skipping one of said three binary pixels;

(c) if said first conversion method is selected, then performing the steps of (i) supplying an inverted value of a first one of said three binary pixels to a first input of a NAND logic, (ii) Supplying a second one of said three binary pixels to a second input of said NAND logic, (iii) supplying a third one of said three binary pixels to a third input of said NAND logic, (iv) supplying said second one of said three binary pixels to a first input of a first AND logic, (v) supplying an output of said NAND logic to a second input of said first AND logic, an output of said first AND logic defining the value of a second one of said four binary pixels, (vi) supplying said second one of said three binary pixels to a first input of a second AND logic, and (vii) supplying a third one of said three binary pixels to a second input of said second AND logic, the output of said second AND logic defining the value of said fourth pixel inserted into said three binary pixels, (viii) defining the value of a first one of said four binary pixels as the value of said first one of said three binary pixels, and (ix) defining the value of a third one of said four binary pixels as the value of said third one of said three binary pixels; and (d) if said second conversion method is selected, then performing the steps of (i) supplying a first one of said three binary pixels to a first input of an AND logic, (ii) supplying a second one of said three binary pixels to a second input of said AND logic, (iii) supplying said first one of said three binary pixels to a first input of a first OR logic, (iv) supplying said second one of said three binary pixels to a second input of said first OR logic, (v) defining the value of a first one of said two binary pixels as the value of an output of said first OR logic, (vi) supplying said output of said AND logic to a first input of a second OR logic, (vii) supplying a third one of said three binary pixels to a second input of said second OR logic, and (viii) defining the value of a second one of said two binary pixels as the value of the output of said second OR logic.

7. A dot density conversion method according to claim 6 wherein said string of three binary pixels is obtained from said graphic, said graphic comprising data of line graphics.

8. A dot density conversion method according to claim 6, wherein said string of three binary pixels is obtained from said text data, said text data comprising vertical lines of a plurality of line widths and horizontal lines of a plurality of line widths.

9. A dot density conversion method according to claim 6, wherein said string of three binary pixels is obtained from said text data, said text data comprising vertical lines of more than one pixel width and horizontal lines of one pixel width.

10. A dot density conversion method according to claim 6, further comprising steps of:

obtaining data of different areas on a memory means, each of said areas corresponding to one of a plurality of data kinds, one of which is text; and selecting the text area from among said different areas for that dot density conversion.

11. A dot density conversion method according to claim 10, further comprising a step of:

drawing the data of each of said areas convened by said converting step to a predetermined position.

12. A dot density conversion method according to claim 10, wherein said data kinds further include a graphic.

13. A dot density conversion method according to claim 10, wherein said data kinds further include an image.

14. A dot density conversion method according to claim 10, wherein said data kinds include at least a first kind of text data based on a character font, and a second kind of text data based on another character font.

15. A dot density conversion method according to claim 6, wherein the string of three binary pixels is obtained from a document, said document including a number of pages, each of said number of pages including at least one area, said at least one area having one of a plurality of data kinds including text data said dot density conversion method further comprising steps of:

inputting a first or a second type of conversion method via a means for data input;

reading out data corresponding to said data kinds of each of said number of pages;

when the conversion method inputted is of a first type, processing said dot density conversion uniformly on whole pages; and when the conversion method inputted is of a second type, processing said dot density conversion for each page based on the reading step.

16. The method of claim 15 wherein said data kinds include text data, image data, and graphic data.

17. The method of claim 16 wherein said text data includes control data and character point data, wherein said graphic data includes a sequence of drawing commands, and wherein said image data includes an attribute part and a data part.

18. The method of claim 17 wherein the read out data includes data kind of said at least one area, position of said at least one area, length in an X direction of said at least one area, length in a Y direction of said at least one area, capacity of said at least one area, and storage location of said at least one area.

19. The method of claim 18 wherein when said data kind of said at least one area is text, the processing of the second type conversion method includes sub-steps of:

retrieving said storage location and said capacity of said at least one area;

reading out area data of said at least one area;

converting said position of said at least one area; and drawing character fonts onto said image memory.

20. The method of claim 18 wherein when said data kind of said at least one area is graphic, the processing of the second type conversion method includes sub-steps of:

retrieving said storage location and said capacity of said at least one area;

reading out area data of said at least one area;

converting said position of said at least one area;

reading out said sequence of drawing commands;

converting values in each of said sequence of drawing commands; and drawing an image based on said convened values onto said image memory.

21. The method of claim 18 wherein when said data kind of said at least one area is image, the processing of the second type conversion method sub-steps of:

retrieving said storage location and said capacity of said at least one area;

reading out area data of said at least one area;

converting said position of said at least one area;

determining the image kind; and performing a first image process or a second image process based on said determination of image kind.

22. The method of claim 21 wherein said first image process includes a step of:

drawing image based on said insert or skip processing onto an image memory.

23. The method of claim 21 wherein said second image process includes steps of:

determining whether a change in dot density exists;

converting image data when a change in dot density has been determined;

drawing image data onto an image memory, wherein said step of convening image data includes sub-steps of convening to a grey scale image data and selecting a dither matrix.

\* \* \* \* \*

UNITED STATES PATENT AND TRADEMARK OFFICE
CERTIFICATE OF CORRECTION

PATENT NO. : 5,493,420

DATED : 20 February 1996

INVENTOR(S) : Hideki KUWAMOTO et al.

Page 1 of 3

It is certified that error appears in the above-identified patent and that said Letters Patent is hereby corrected as shown below:

| Column | Line | |
|---|---|---|
| 1 | 11 | Change "an" to --a--. |
| 1 | 34 | Change "intervals," to --interval,--. |
| 2 | 11 | After "Finally" insert --,--. |
| 3 | 7 | Change "view" to --views--. |
| 3 | 23 | Change "image" to --graphic--. |
| 6 | 60 | Change "FIG." to --FIGS.--. |
| 6 | 65 | After "to be" insert --outputted--. |
| 7 | 44 | Change "intervals" to --interval--. |
| 7 | 54 | Change "OR" to --AND--. |
| 7 | 57 | Change "intervals" to --interval--. |
| 7 | 63 | Change "intervals" to --interval--. |

UNITED STATES PATENT AND TRADEMARK OFFICE
CERTIFICATE OF CORRECTION

PATENT NO. : 5,493,420

DATED : 20 February 1996

INVENTOR(S) : Hideki KUWAMOTO et al.

It is certified that error appears in the above-identified patent and that said Letters Patent is hereby corrected as shown below:

| Column | Line | |
|---|---|---|
| 8 | 11 | Change "time" to --the--; change "intervals" to --interval--. |
| 8 | 19 | Change "time" to --the--. |
| 8 | 25 | After "as" delete ",". |
| 8 | 37 | Change "There," to --Thereby,--. |
| 8 | 38 | After "prevent" insert --degradation of image quality such as--. |
| 8 | 38 | After "moire" insert --or density change--. |
| 8 | 40 | After "images" insert --,-- and delete "and degradation of image". |

UNITED STATES PATENT AND TRADEMARK OFFICE
CERTIFICATE OF CORRECTION

PATENT NO. : 5,493,420

DATED : 20 February 1996

INVENTOR(S) : Hideki KUWAMOTO et al.

It is certified that error appears in the above-identified patent and that said Letters Patent is hereby corrected as shown below:

| Column | Line | |
|---|---|---|
| 8 | 41 | Delete "quality such as the density change"; after "and" insert --also can prevent--; after "irregularity" insert --,-- and delete "can". |
| 8 | 42 | After "increase" replace "and" with --or--; change "lines" to --line width--. |
| 12 | 21 | Change "convened" to --converted--. |
| 12 | 35 | After "text data" insert --,--. |
| 13 | 15 | Change "convened" to --converted--. |
| 13 | 20 | After "method" insert --includes--. |
| 14 | 18 | Change "convening" to --converting--. |
| 14 | 19 | Change "convening" to --converting--. |

Signed and Sealed this

Fifth Day of November, 1996

*Attest:*

BRUCE LEHMAN

*Attesting Officer*    *Commissioner of Patents and Trademarks*